United States Patent [19]
Hartley

[11] 3,727,465
[45] Apr. 17, 1973

[54] ACCELEROMETER

[76] Inventor: Ezra Dale Hartley, 2700 Jalmia Drive, Los Angeles, Calif. 90046

[22] Filed: Aug. 6, 1970

[21] Appl. No.: 61,747

[52] U.S. Cl. .................................. 73/492, 73/514
[51] Int. Cl. .............................................. G01p 15/04
[58] Field of Search .................................................
73/514–517, 490, 540, 544, 545, 492, 382;
74/18.1, 575, 577 SF, 530

[56] References Cited

UNITED STATES PATENTS

| 3,111,035 | 11/1963 | ten Bosch et al. | 73/514 X |
| 2,857,149 | 10/1958 | Bourns et al. | 73/516 X |
| 3,020,767 | 2/1962 | Kistler | 73/497 |
| 2,394,974 | 2/1946 | Bevins | 73/492 |
| 2,831,670 | 4/1958 | Bourns et al. | 73/516 |
| 1,702,762 | 2/1929 | Brubaker | 74/18.1 |
| 2,560,326 | 7/1951 | Barry | 73/382 |
| 2,953,023 | 9/1960 | Goodell | 73/382 |

Primary Examiner—James J. Gill
Attorney—Flehr, Hohbach, Test, Albritton & Herbert

[57] ABSTRACT

An accelerometer having an axially movable inertial body restrained by a coaxial coil spring rotated onto the external thread of an externally and internally threaded rotatable collar on a threaded post protruding from a frame with rotation of the coaxial and/or the spring selectively changing the neutral position of the body and/or the effective length of the spring for calibration. A flat flexure member connects the body to the rack of a pointer operating drive train to reflect the displacement of the body independently of limited rotation of the body. Oppositely spring biased ratched wheels are connected to a pair of maximum memory pointers rotatable by the operating pointer. Flexible reed pawls mounted on a forwardly biased slidable block with a V-notch are positioned for engagement with the ratchet wheels to maintain the memory pointers at their positions of maximum rotation. The pawl block is slidable rearwardly to free the ratchet wheels, and reset the memory pointers, by a push-button operated rod extending through an opening in an hermetically sealed container surrounding the frame, with sealing maintained by a flexible bellows which pivots with the rod. The body is locked for shipment by a hook that is pivoted to the frame and spring biased into the body with a push-button being provided through the container and sealed by a bellows, for pivoting and holding the hook against the biasing force and away from the body.

14 Claims, 8 Drawing Figures

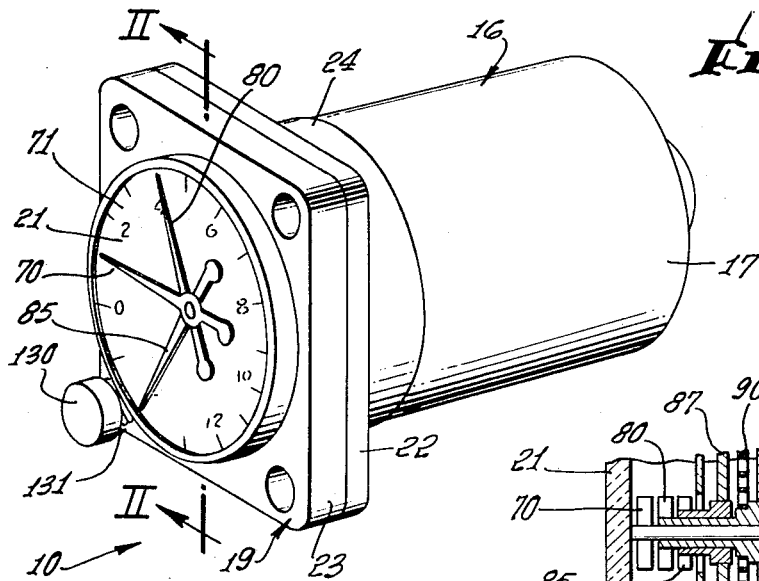
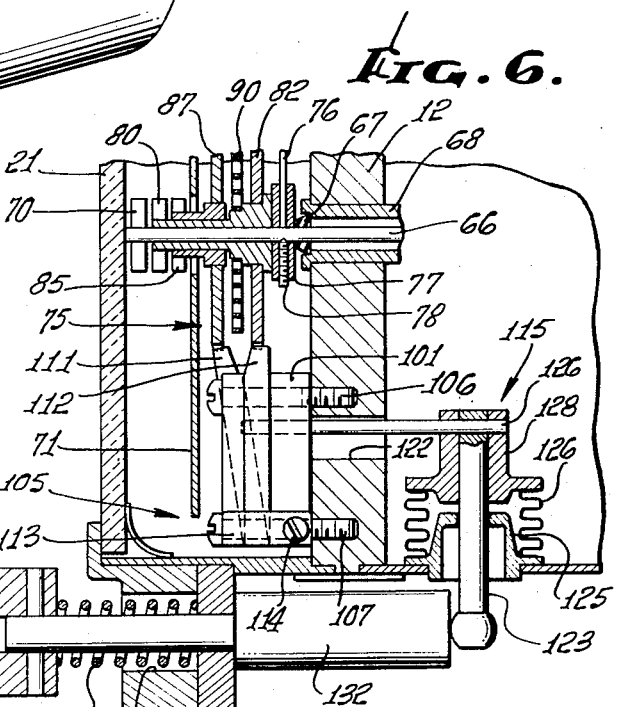
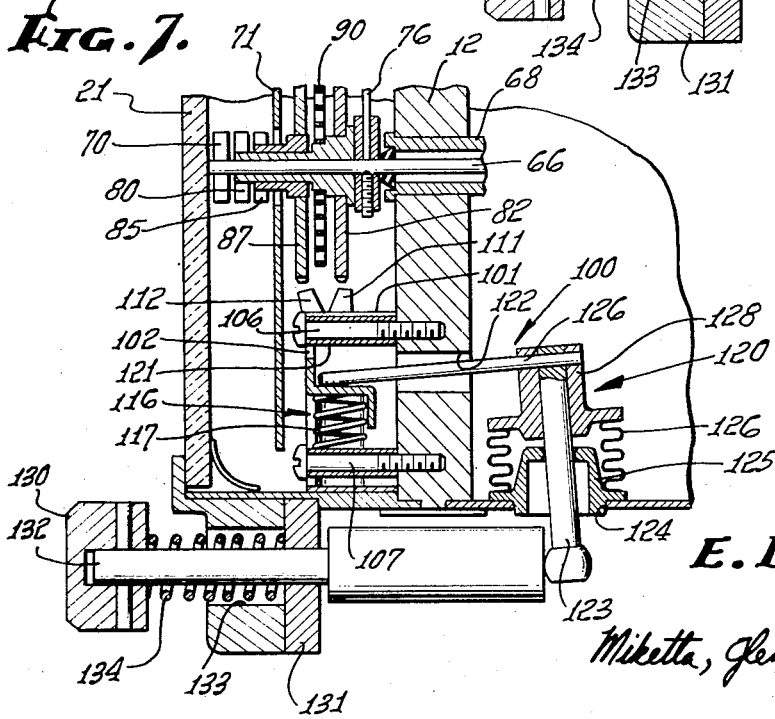

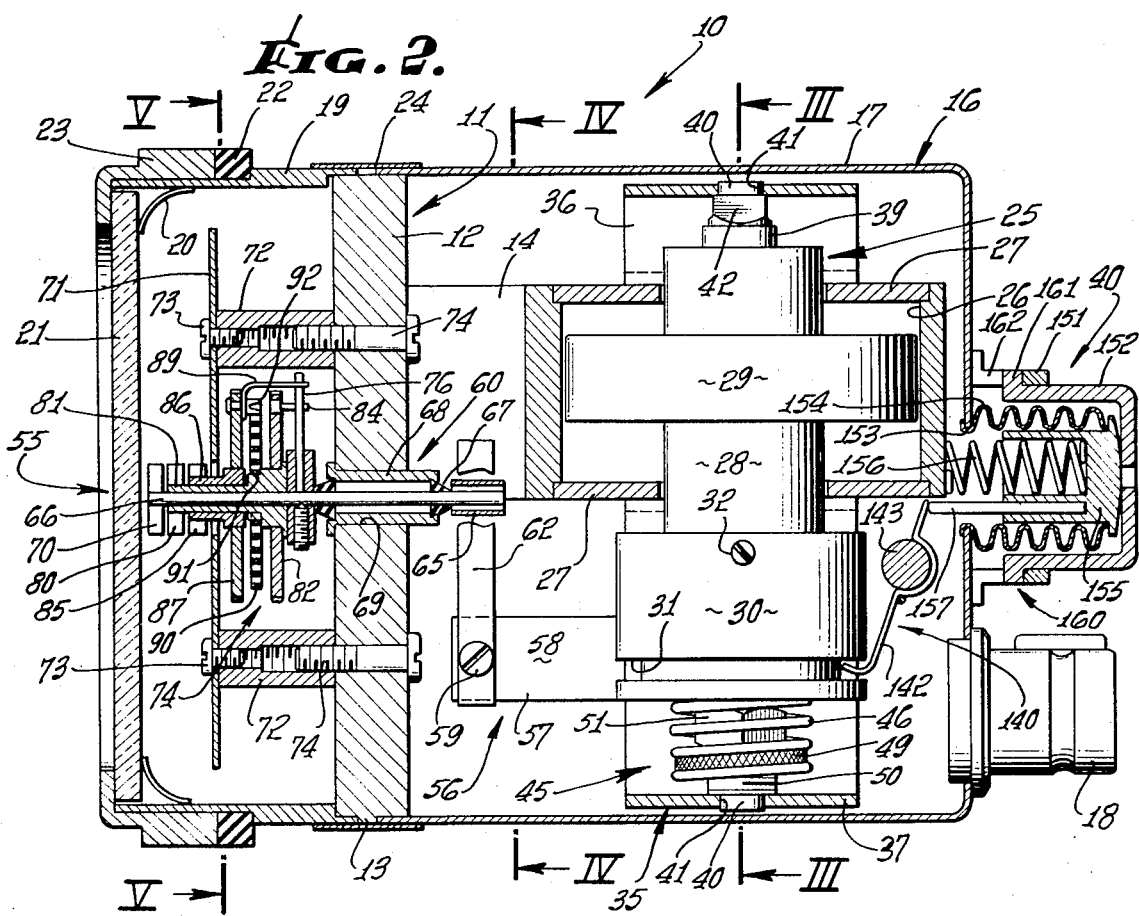
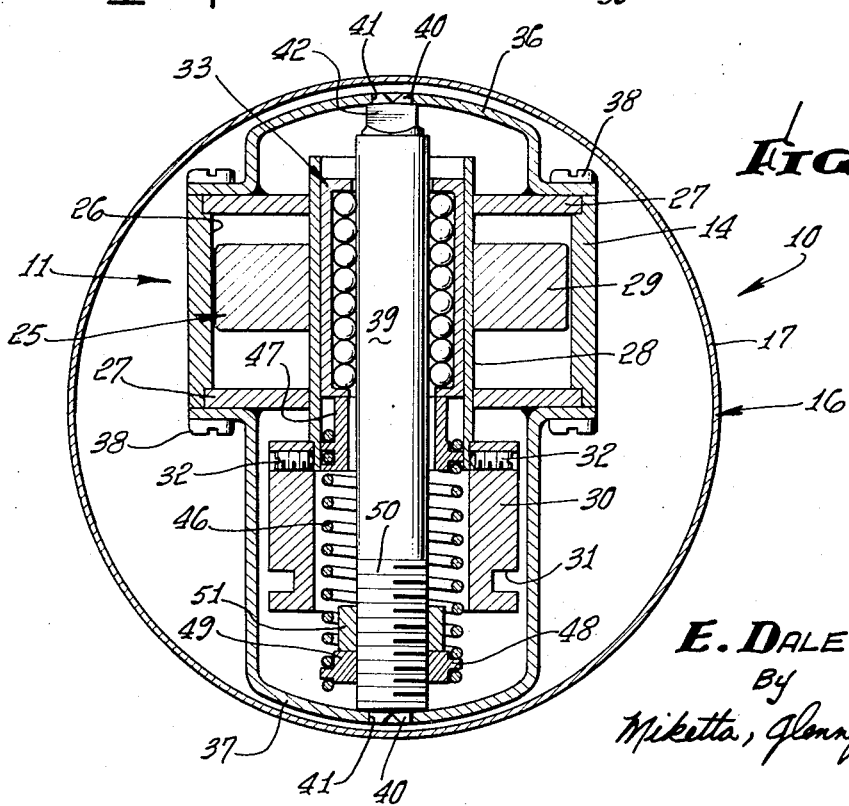

INVENTOR.
E. DALE HARTLEY
BY
Miketta, Glenny, Poms & Smith
ATTORNEYS.

ACCELEROMETER

BACKGROUND OF THE INVENTION

This invention relates to measuring instruments, and more particularly to accelerometers for measuring both acceleration and deceleration along an axis.

Aircraft need an accurate accelerometer to furnish an indication to the pilot of the load on the structure of the aircraft, caused by the acceleration thereof along the normal axis of the aircraft to enable the pilot to maneuver the aircraft within the designated operational limits. For this application, an accelerometer is required which indicates the acceleration along the normal axis with respect to the aircraft. Normally the accelerometer for such use is calibrated in gravitational units or G units. The governmental specifications for such an accelerometer require a continuously operating pointer for instantaneously indicating positive or negative acceleration on a dial, as well as two maximum memory pointers, one of which moves with the operating pointer to the position indicating the maximum positive acceleration where this pointer remains while the operating pointer returns to a lower value, and the other of which moves with the operating pointer to the position indicating the maximum negative acceleration again where this pointer remains while the operating pointer returns. With the maximum memory pointers, the pilot can tell at a glance the current acceleration and the positive and negative limits of the accelerations or G-load to which he and the aircraft have been subjected. Manual reset mechanism is usually provided to permit the pilot to return the memory pointers to the operation pointer when so desired.

There are several accelerometers on the market today which will perform the previously described functions adequately and so will meet the federal specifications on accelerometers for aircraft use. However the mechanism of these accelerometers is very complicated, introducing error and response delay to the instrument. Many of the prior art accelerometers apply the resistive force to the inertial body or mass through a gear set with the inherent friction and adjusting problems associated therewith which complicate manufacture and adjustment and induce error into the mechanism. The use of gear sets also introduces a force couple into the movement of the body which must be countered by suitable pulleys, bearings, etc. all of which add more friction to the instrument to decrease its accuracy and which add complication to the mechanism for assembly and calibration. Also the use of gear sets makes the alignment thereof and the surfaces thereof quite critical in obtaining the required accuracy of the instrument. Therefore it would seem desirable to apply the resistive force directly to the body and thereby eliminate the gear sets as a load carrying unit and the couple caused thereby for greater accuracy.

Many of the prior art accelerometers have means for locking the body against extreme acceleration and shock during the shipment thereof. Most of these locking means translate manual movement into frictional or other engagement of the locking means with the body. If the person locking the instrument is not careful about the amount of torque applied to the locking means or if the mass is not in the proper position for locking the mechanism, the locking procedure can deform the internal mechanism so that the accelerometer will not operate effectively when the body is released later on.

SUMMARY OF THE INVENTION

Therefore it is the primary object of this invention to provide novel accelerometer primarily for use in aircraft.

Other and additional objects of this invention are to provide an accelerometer with an internal body or mass which is axially rotatably and slidably mounted to a frame for being directly restrained to a neutral position, to provide such an accelerometer with the internal body thereof coaxially engaged by a restraining spring to eliminate any force couples on the body, to provide an accelerometer with such a spring with an anchor which changes the effective spring length and therefore the spring rate, as well as the neutral position of the spring for calibration of the accelerometer, to provide an accelerometer with a rotatable body, and a drive train for operating a pointer with only minor force transfer therebetween, to provide such an accelerometer with a flexure member connecting the body to the rack of the drive train to frictionlessly move the the rack as the body is displaced, without reflecting the rotation of the body, to provide an accelerometer with memory pointers on ratchet wheels oppositely biased against each other to become a separate subassembly of the accelerometer, to provide such an accelerometer with such wheels engaged by flexible, slender reed pawls which are vibration resistant, to provide such an accelerometer with a slidable pawl block mounting the reed pawls for selective disengagement from the ratchet wheels when the block is slid rearwardly to permit the memory pointers to be returned to zero, to provide such an accelerometer with such a pawl block with Vee sides for engagement with locating means to repeatedly properly relocate the pawl block and the pawls thereon for engagement with the ratchet wheels in the forward position of the pawl block, to provide such an accelerometer with an hermetically sealed container having a bellows surrounded rod pivoted thereto to transfer manual movement outside the container to within the container to slide the block rearwardly, to provide such an accelerometer with a spring-biased locking mechanism for selectively locking the inertial body against movement during shipment thereof, to provide such an accelerometer with a holding mechanism for holding the locking mechanism against the biasing force of the spring, to provide an accelerometer which is economical to manufacture, which is easy to calibrate and assemble, which is accurate and rapidly responsive to acceleration, which is simple to lock for transportation, and unlock for use, and which has easily resettable memory pointers.

Generally, the accelerometer according to this invention includes a frame with an inertial body mounted thereto for reciprocation along an axis, restraining means for coaxially restraining the body to a neutral position, with the acceleration displacing the body therefrom, and indicating means for indicating the displacement of the mass and therefore the acceleration. The accelerometer may include a coil spring coaxially secured to the body and secured to the frame by a rotatable collar with threads engaging the spring to change the effective length thereof for calibration. A flexible connection may be provided between the rotatable body and a pointer-operating rack and pinion unit to virtually frictionlessly indicate displacement of the body of the unit without indicating the rotation of the body. A sliding V-block may be provided to mount flexible reed pawls for engaging memory pointer ratchet wheels, with the V-block properly locating the reed pawls for engagement after the block has been slid rearwardly to release the ratchet wheels. A pivoted bellows surrounded rod may be provided through the hermetically sealed container surrounding the accelerometer to operate the sliding block. A spring-biased locking means may be provided to lock the body against movement during shipment, and a manually operated holding means may be provided for holding the locking means away from the body during operation of the accelerometer.

BRIEF DESCRIPTION OF THE DRAWINGS

FIG. 1 is a perspective view of the accelerometer according to this invention with the memory pointers thereof being shown displaced to illustrative positions and the operating pointer at the 1 G position on the dial thereof.

FIG. 2 is a sectional view taken along the plane II—II of FIG. 1, with the inertial body shown in its position substantially corresponding to a 1 G condition.

FIG. 3 is a sectional view taken along the plane III—III of FIG. 2 particularly showing the construction of the inertial body, the mounting means therefor, and the restraint means therefor.

FIG. 6 is a sectional view taken along the plane VI—VI of FIG. 5 showing the details of construction of the mounting and locating means of the pawls, with the block thereof shown in its inner or operative position.

FIG. 7 is a sectional view similar to FIG. 6 but with the block shown in its outer or release position.

DETAILED DESCRIPTION OF THE PREFERRED EMBODIMENT

Figure 4:
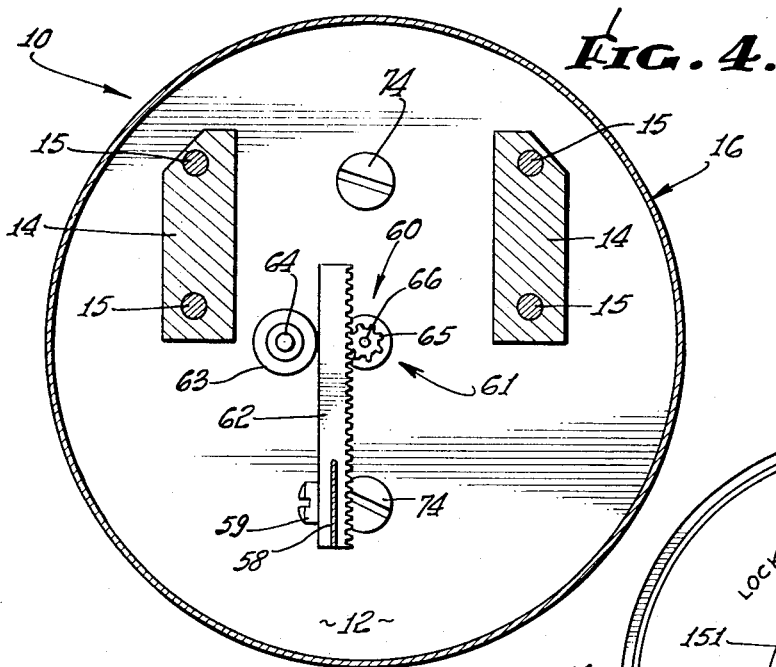
FIG. 4 is a sectional view taken along the plane IV—IV of FIG. 2 showing the rack and pinion unit of the accelerometer.
Figure 8:
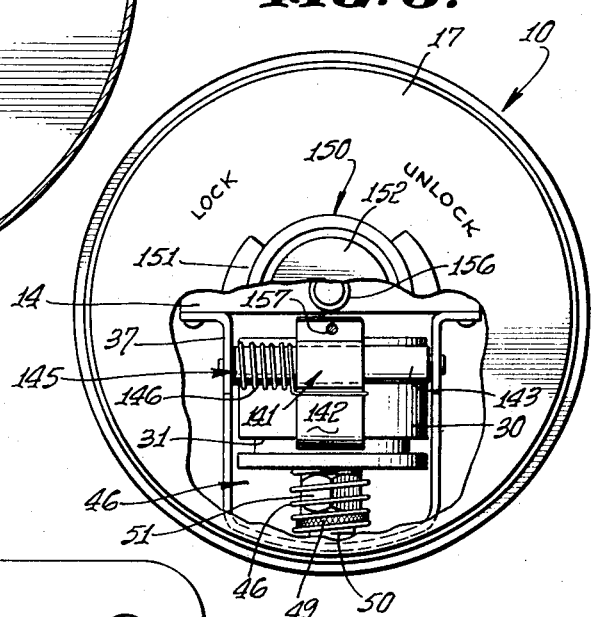
FIG. 8 is an end view with a portion of the end wall broken away to show the details of construction of the locking mechanism.

Referring now to the drawings, and particularly to FIG. 1, the improved accelerometer according to this invention is generally noted by the number 10. Generally, the accelerometer includes a frame 11 surrounded by an airtight container 16, an inertial body or mass 25, mounting means 35 for mounting the body 25 to the frame 11 for reciprocation along an axis normal to the frame, restraint means 45 between the frame 11 and the body 25 for coaxially restraining the body 25 to a neutral position along the axis and indicating means 55 for indicating the displacement of the body 25 from the neutral position and therefore the acceleration to which the body 25 was subjected. The indicating means 55 may include a drive train 56 with connecting means 57 for connecting the body 25 to transforming means 60 for changing the displacement of the body 25 into rotation of an operating pointer 70 as well as a maximum positive and negative acceleration memory pointers 80 and 85. The indicating means 55 also includes pawl mounting and locating means 100 to facilitate the resetting of the memory pointers 80 and 85. The accelerometer 10 also includes a locking mechanism for locking the body 25 against movement during shipment of the accelerometer 10.

Referring now to FIG. 2 in the preferred embodiment of the accelerometer 10, the frame 11 includes a disk 12, with a circumferential ridge 13, to which a rearwardly extending block 14 is secured by screws 15. The rearwardly extending block 14 has a series of openings therethrough which will be described particularly with the parts located therein.

The frame 11 is surrounded by an hermetically sealable container 16 for providing a controlled environment for the internal mechanism of the accelerometer 10. The container 16 includes a cylindrical rear housing 17 with a rearwardly protruding electrical connector 18 secured to the rear face thereof. The electrical connector provides for the passage of electrical current into the container 16 to provide lights to the accelerometer 10. The accelerometer lights and electrical wiring have been omitted from the drawing to more clearly illustrate the novel features of the accelerometer 10.

The container 16 also includes a forward housing 19 having a radially inwardly protruding circumferential glass seat 20 for locating the glass 21 at the forward edge of the housing 19. An eared mount 22 slides around the forward housing 19 after which a glass cap 23 slides over the forward housing 19 to sealingly hold the glass 21 against the glass seat 20 and seal the front of the forward housing 19.

When the internal mechanism of the accelerometer 10 has been assembled and calibrated, the mechanism is enclosed by sliding the open rear end of the forward housing 19, and the open front end of the rear housing 17, onto the disc 12 of the frame 11 to butt against the circumferential ridge 13. A sealing ring 24 is soldered over the juncture of the forward housing 19, the rear housing 17 and the disc 12 to complete the sealing of the container 16 except for a small hole (not shown) in the rear surface of the rear housing 17. The small hole is left open to permit the air in the container 16 to be evacuated and a suitable artificial atmosphere to be inserted therethrough into the container 16, to remove any moisture that might remain, to provide an inert atmosphere for the internal mechanism and to provide a positive pressure to locate any leaks that might occur in the container. A suitable atmosphere for this purpose is dry nitrogen with about 5 percent helium. Once the artificial atmosphere has been inserted into the container 16, the hole is sealed to hermetically seal the container 16 from the atmosphere.

Referring now to FIG. 2 for the details of the internal mechanism of the preferred embodiment of the accelerometer 10, the inertial body or mass 25 is located partially in cavity 26 in the rearwardly extending block 14, and defined by apertured end caps 27. The inertial body or mass 25 itself includes a sleeve 28 on which an upper disk 29 located in the cavity 26 is mounted. The sleeve 28 also has a lower disc 30 with a circumferential notch 31 therearound. A plurality of set screws 32 are provided through the upper and lower disc 29 to secure the discs 29 and 30 to the sleeve 28 in the proper position therealong. As best seen in FIG. 3, the sleeve 28 has inserted therein a ball bushing 33.

The mounting means 35 for mounting the body 25 to the frame 11 for reciprocation along an axis normal to the frame is best shown in FIGS. 2 and 3. The mounting means 35 includes an upper U-bracket 36 and a lower U-bracket 37 secured by screws 38 to the block 14 above and below the cavity 26. A guide post 39 extends between the upper and lower brackets 36 and 37, through the apertured end caps 27 and cavity 26. The guide post 39 has reduced ends 40 which are inserted in aligned openings 41 in the upper and lower brackets 36 and 37 with the brackets having a springing action to hold the guide post 39 therebetween. The upper end of the guide post 39 below the upper reduced end 40 has flats 42 on which a wrench may be received to rotate the guide post 39 for calibration as will be explained later. As seen in FIG. 3, the guide post 39 extends through the inertial body or mass 25 to guide the movement of the body 25 along the axis of the guide post. It should be noted that the body 25 may not only reciprocate along the guide post 39 but is also free to rotate relative to guide post 39.

The restraining means 45 for coaxially restraining the body 25 to a neutral position along the axis includes as seen in FIG. 3 a coil spring 46. The upper end of the coil spring 46 is screwed into a seat 47 located in the lower end of sleeve 28. The lower end of the coil spring 46 is screwed onto mating external threads 48 of a collar 49. The collar 49 is internally threaded to mate with the external threads 50 on the lower end of guide post 39, and has a knurled surface to permit its rotation relative to the spring 46 and the post 39, for calibration, in a manner to be explained later. A jam nut 51 is also screwed onto the external threads 50 of the guide post 39 for locking the collar 49 in any desired position along the guide post 39.

It should be noted that the coil spring 46 restrains the body 25 at the neutral position from both upward displacements relative to the frame 11 because such displacement stretches the spring 46, and downward displacement relative to the frame 11 because such displacements compress the spring 46. As the spring 46 is either compressed or stretched by the body 25, the internal stress in the coils of the spring 46 will rotate the body 25 slightly relative the guide post 39. Other than the slight rotation just mentioned, the spring 46 exerts no forces on the body 25 except the co-axial forces needed to restrain the body 25 to the neutral position, thus eliminating all force couples from the body 25 and the complications caused thereby.

The restraining means 45 and specifically the coil spring 46 locates the mass 25 in a neutral position generally centrally of the cavity 26. When the position of the frame 11 is changed quickly relative the inertial body or mass 25, the mass 25 in attempting to remain in a constant location is displaced relative the frame 11. The amount of displacement of the inertial body or mass 25 relative the frame 11 is resisted by the coil spring 46 so that the amount of displacement of the inertial body or mass 25 is directly proportional to the rate of change of direction of the frame 11 or the acceleration thereof.

The indicating means 55 is provided for indicating displacement of the body 25 from the neutral position, and therefore the acceleration to which the body 25 was subjected. The indicating means 55 includes a drive train 56 with connecting means 57 connecting the body 25 to the transforming means 60 to convert the displacement of the body 25 along the axis from the neutral position into rotation of the operating pointer 70.

As best seen in FIG. 2 the connecting means 57 in the preferred embodiment includes a flat flexure member 58 with the aft end secured in a radial slot in the disc 30 of the body 25 and the other end extending radially outwardly therefrom.

The transforming means 60 of the preferred embodiment as seen in FIG. 4, includes a rack and pinion unit 61 with a rack gear 62 having the lower end thereof secured to the far end of the flat flexure member 58 by screws 59. The back side of the rack gear 62 is supported by a rack bearing 63 mounted on a post 64 extending rearwardly from the disc 12. The pinion gear 65 of the rack and pinion unit 61 is mounted on a shaft 66 supported by bearings 67 located in either end of cylindrical bearing housing positioned in a central hole 69 through the disc 12. The rack and pinion unit 61 changes axial motion of the body 25 along the guide post 39 into rotary motion of the shaft 66.

It should be noted that the provision of the flat flexure member 57 to connect the rack gear 52 to the inertial body 25 permits the body 25 to rotate on the guide post 39 a small amount such as the amount caused by the flexure of the spring 46 without being reflected in the position of the rack gear 62. Also it should be noted that because the flat flexure member 57 is flexed by the rotation of the inertial body 25, the rotation of the inertial body 25 does not add friction to the mechanism.

The operating pointer 70 is mounted on the forward end of the shaft 66. A dial 71 is mounted behind the operating pointer 70 on dial spacers 72 with screws 73 securing the dial 70 to the dial spacers 72, and with the screws 74 securing the dial spacers 72 to the disc 12 of the frame 11. Rotation of the shaft 66 by the rack and pinion unit 61 in response to displacement of the inertial body 25 from the neutral position will rotate the pointer 70 in a corresponding direction and distance to indicate the rate of acceleration to which the unit was subjected.

The indicating means 55 of the preferred embodiment is also provided with a maximum memory pointer mechanism 75 for indicating the maximum displacement of the pointer 70 and therefore the maximum acceleration to which the accelerometer 10 has been subjected. The maximum memory pointer mechanism, as best seen in FIG. 2, includes a radial pin 76 extending radially outwardly of a sleeve 77 around the shaft 66 and secured thereto by a set screw 78.

The maximum memory pointer mechanism 75 includes a maximum negative acceleration memory pointer 80 and a maximum positive acceleration memory pointer 85. The maximum negative acceleration memory pointer 80 indicates the maximum value of the upward acceleration or counterclockwise rotation of the pointer 70 while the maximum positive acceleration memory pointer 85 indicates the maximum value of the downward acceleration or clockwise rotation of the operating pointer 70. Memory mechanism 75 also includes fore and aft ratchet wheels 87 and 82 respectively, whose functions will now be described.

Figure 5:
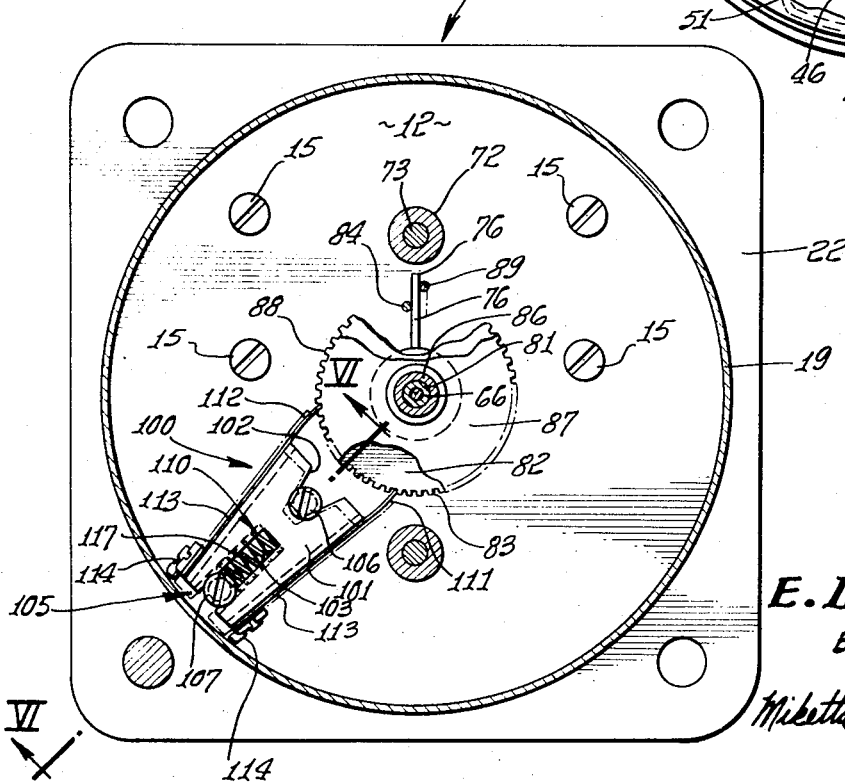
FIG. 5 is a sectional view taken along the plane V—V of FIG. 2 with a portion of the ratchet wheels broken away to show the dual wheel mechanism and the mounting and locating means of the pawls.

The maximum negative acceleration memory pointer 80 is mounted on a sleeve 81 around the shaft 66 directly behind operating pointer 70. The sleeve 81 has mounted thereon the aft ratchet wheel 82 having circumferential teeth 83. Aft ratchet wheel 82 has adjacent to its outer edge a driving peg 84 which, as best seen in FIGS. 2 and 5, extends rearwardly and may, during negative acceleration, be abuttingly engaged by the radial pin 76.

The maximum positive acceleration memory pointer 85 is mounted on a sleeve 86 around the sleeve 77 directly behind pointer 80. Fore ratchet wheel 87 is mounted on the sleeve 86, and has circumferential teeth 88 and a rearwardly extending driving pin 89, which may during positive acceleration, be abuttingly engaged by the radial pin 76. A torsion spring 90 is mounted to the sleeve 81 with the inner end 91 thereof anchored to the sleeve 81. The outer end of the torsion spring 90 is anchored at 92 to the fore ratchet wheel 87 so that the torsion spring 90 biases both wheels 87 and 82 oppositely towards the radial pin 76. With the torsion spring 90 anchored between the ratchet wheels 82 and 87 rather than between the wheels and the frame as is conventionally done, the dial 71 and the mechanism along sleeve 81 can be removed and replaced as a unit from the shaft 66 quickly because no time is needed to reset the torsion spring 90.

The memory pointer mechanism 75 of the preferred embodiment includes a pawl mounting and locating means 100 for use with the ratchet wheels 82 and 87 to provide a conventional ratchet mechanism for selectively permitting rotation of the ratchet wheels in one direction while preventing rotation of the ratchet wheels in the opposite direction. Referring now to FIG. 5, the pawl mounting and locating means 100 includes a pawl block 101 with a forwardly opening V-notch 102 and a rearwardly opening slot 103. A guide means 105 in the form of an inner upstanding post 106 and an outer upstanding post 107 slidably mount the pawl block 101 on the forward face of the disc 12. As seen in FIGS. 5, 6, and 7, the pawl block 101 is slidable between an inner position where the inner upstanding post 106 engages the slides of the V-notch while the outer upstanding post 107 is in the slot 103 to precisely locate the pawl block, and an outer position wherein the pawl block 101 is loosely restrained by the upstanding posts 106 and 107.

Pawl means 110 are mounted to the pawl block 101 for pivoting into and out of engagement with the teeth of the ratchet wheels 82 and 87. In the preferred embodiment, the pawl means 110 includes, as seen in FIGS. 5, 6 and 7, first and second elongated flexible reeds 111 and 112 with the outer ends thereof mounted on opposite sides of the pawl block 101 at the outer ends thereof by plates 113 secured thereto by screws 114. As best seen in FIG. 6, the inner ends reeds 111 and 112 chamfered oppositely so that first reed 111 engages the teeth 83 of the aft ratchet wheel 82 and the second reed 112 engages the teeth 88 of the fore ratchet wheel 87 in the inner position of the pawl block 101.

As best seen in FIG. 5, rotation of the aft ratchet wheel 82 counter clockwise cams first reed 111, away from the pawl block 101, flexing the reed 111 to permit the counter clockwise rotation. Attempted clockwise rotation of the aft ratchet 82, catches the inner end of reed 111 in the teeth 83 and attempts to flex the reed 111 into the pawl block 101 which cannot be done so that the reed 111 holds the wheel 82 from rotating clockwise. The rotation of the fore ratchet wheel 87 is similarly restricted by the second reed 112 except that because the reed 112 is located on the other side of pawl block 101, the fore ratchet wheel 87 is is prevented from rotating counter clockwise and permitted to rotate clockwise. When the pawl block 101 is moved to the outer position as seen in FIGS. 5 and 7, the inner ends of both reeds 111 and 112 are moved away from the circumferential teeth 83 and 88, permitting the torsion spring 90 to return the ratchet wheels 82 and 87 until the driving pegs 84 and 89 again engage the radial pin 76.

The use of pawl means including elongated flexible reeds 111 and 112 keeps the pawl means from being affected by vibration because the reeds 111 and 112 have such a small mass. The mounting of the reed 111 and 112 at the outer end of the pawl block 101 gives the reeds a compound flexibility, i.e. the reeds are very stiff when moved towards the block 101 because of the engagement with the sides of the block 101 shortening the flexible length and the reeds are very flexible when moved away from the block 101 because of the long flexible length to the mounting outer ends.

The pawl mounting and locating means 100 also includes moving means 115 for moving the pawl block 101 between the two positions, to selectively release the ratchet wheels 82 and 87 for rotation in either direction. The moving means 115 includes a biasing means 116 for biasing the block 101 to the inner position, and sliding means 120 for moving the block against the biasing means 116 from the inner position to the outer position. In the preferred embodiment, the biasing means 116 includes a spring 117 located in the slot 103 with the inner end thereof engaging the pawl block 101 in the outer end thereof engaging the outer upstanding post 107 to bias the pawl block radially inwardly to the inner position.

The sliding means 120 of the preferred embodiment because it must act through the airtight container 16 is really a sealable operating means. The sliding means 120 includes a slot 121 in the pawl block 101 which opens to a slot 122 through the disc 12 of the frame 11. A rod 123 extends through a side opening 124 in the rear housing 17 and is mounted by pivot mount 125 therein. The rod 123 has a finger 126 on the end thereof which extends through slot 122 in the disc and into the slot 121. The seal is maintained around the rod 123 by a flexible bellows 126 extending from the inner surface of the housing 17 to terminate in rod receiving end 128 around the inner end of rod 123.

The sliding means 120 also includes a reset button 130 located in front of the lower left ear 131 of the mount 22. The reset button 130 is mounted on the fore end of a plunger 132 extending through an enlarged hole 133 in the glass cap 23 and through the hole in ear 131 with the enlarged aft end of the plunger 132 engaging the outer end of rod 123 outside of container 16. A spring 134 is located about the plunger 131 between the ear and the button 131 to bias the plunger forwardly.

As seen by comparing FIG. 6 and 7, when the reset button 130 is pressed, the plunger 132 outside the container 16 pivots the rod 123 to move the pawl block 101 inside the container 16 against the biasing of spring 11, to the outer position, disengaging the reeds 111 and 112 from the teeth 83 and 88 respectively, to free the ratchet wheels 82 and 87 so that the torsion spring 90 can return the memory pointers 80 and 85 to the position of the operating pointer 70 to reset the maximum memory pointer mechanism 75.

The preferred embodiment of the accelerometer 10 is also provided with a locking mechanism 140 for directly locking the body 25 against movement during shipment to prevent the body 25 from being subjected to extremely high accelerations which may destroy its calibration and/or operability. The preferred embodiment of the locking mechanism 140 includes a catch means 141 for engaging the body 25 to hold the body 25 against movement relative the frame 11. As seen in FIGS. 2 and 18, the catch means 141 includes a hook 142 pivoted on rod 143 extending between the sidewalls of the lower U-bracket 37. A biasing means 145 in the form of a torsion spring 146 is provided to bias the hook 142 into engagement with the body 25 and specifically into the circumferential notch 31 in the lower disc 30 thereof.

With the hook 142 being biased into the holding position, an operating means 150 is provided for selectively moving the catch means 141 against the urging of the biasing means 145 to an unlocked position, to free the body 25. The operating means of the preferred embodiment as best seen in FIG. 2 includes a slotted cylindrical guide 151 centrally located on the rear surface of the rear housing 17. The slotted guide 151 has slidably mounted therein a push button 152 over an opening 153 in the rear housing 17. The opening 153 is surrounded by a bellows 154 with the rear end of the bellows secured to an inner button 155 to close the opening 153 in the housing 17. The inner button 155 is biased rearwardly by spring 156 and has a rod 157 extending forwardly therefrom to engage the hook 142 and pivot the hook 142 on rod 143 away from the body 25.

The locking mechanism 140 is also provided with holding means 160 which in the preferred embodiment includes radially outwardly extending ears 161 on the forward end of the push button 152 which extend to camming slots 162 in the guide 151. When the push button 152 has been pushed inwardly to pivot the hook 142 away from the body 25, and unlock the body 25, the push button 152 can be rotated 90° to a position where the ears 161 by engaging the walls of slots 162 hold the button 152 inwardly, and thereby hold the hook 142 away from the body 25.

To lock the body 25 against movement, the push button 152 merely need be rotated back 90° to where the ears 161 permit the spring 156 to move the button 152 rearwardly, freeing the hook 142. The torsion spring 146 then exerts a limited force on the hook 142 to pivot the hook 142 into the notch 31 to hold the inertial body 25 against movement. By using spring biasing to lock and manual force to unlock, the amount of force applied to the accelerometer 10 to lock it may be limited to prevent the locking of the accelerometer 10 from damaging the internal mechanism or changing the calibration.

The calibration of the internal mechanism of the accelerometer 10 prior to the internal mechanism being encased in container 16 is simply and quickly accomplished because the rotation of the collar 39 relative to the spring 46 and/or the guide post 39 provides the adjustments needed to both center the neutral position of the body 25 and change the linear spring rate of the spring 46 to correspond to the operating point readings on the dial 71.

First of all with the hook 142 pivoted away from the body 25, the body 25 is pushed upwardly until the upward disc 29 thereof engages the upper end cap 27. A calibrating operating pointer 70 is pressed onto the shaft 66 at the position corresponding to the dial position reading −5 G's. The body 25 is then pushed downwardly until the upper disc 29 engages the lower end cap 27 to check that the pointer 70 reads +10 G's on the dial 71.

The frame 11 is now positioned so that the guide post 39 is horizontal, and the guide post 39 is rotated by a wrench (not shown) on flats 42 relative to the collar 49 moving the collar 39 therealong until the pointer 70 reads 0 G's on the dial 71. This step locates the neutral position of the body so that the upper disc 29 is properly positioned in the cavity 26.

Next the frame 11 is positioned, right side up, with the guide post vertically oriented and the collar 49 is rotated relative to the spring 46 to change the number of active coils of the spring 46 and therefore linearly change the spring rate until the pointer 70 reads 1 G. Because the pitch of the external threads of the collar 49 and of the post 39 are not the same, the frame must be returned to the horizontal position, and the guide post 39 rotated again until the pointer returns to the zero reading. This process is repeated until the pointer reads 1 G in the vertical position and zero G's in the horizontal position without any corrections being needed.

The calibration is not tentatively complete, and the jam nut 51 is turned into the collar 49 to hold the collar 49 in place on the guide post 39. The opposed spring action of the brackets 36 and 37 holds the guide post 39 from rotating relative the frame 11.

The frame 11 is now turned upside down to check that the pointer 70 reads −1 G. If the pointer does not so read, the above steps will be repeated until such a reading is obtained.

The accelerometer 10 may also be placed on a centrifuge which will subject the accelerometer 10 to much higher accelerations to check the calibration thereof if desired.

After the calibration of the accelerometer is completed, the calibrating operating pointer 70 is removed and the permanent operating pointer 70 is pressed onto the shaft 66. The internal mechanism is then inserted and sealed in the airtight container 16 as has already been described to complete the accelerometer 10.

It must be noted that the provision of the threaded engagement between the collar 49, the spring 46 and the guide post 39 permits small increments of adjustment in the relative positions of these parts to give accurate calibration. Also because the adjustments can be made with these parts assembled, the technician making the adjustments, will not loose his place as often happens if disassembly and reassembly is required to make the necessary adjustments.

When the accelerometer is installed in the airplane with the axis of the guide post normally oriented to the airplane, a climb by the aircraft raises the frame 11 relative the body 25, displacing the body 25 from the neutral position, an amount proportional to the rate of acceleration to which the frame 11 is subjected. The displacement of the frame 11 upwardly relative the body 25, moves the body 25 downwardly along the guide post 39 relative the frame 11 with the displacement thereof being transferred by the flat flexure member 58 to the rack gear 62 to rotate the pinion gear 65 and the shaft 66, rotating the operating pointer 70 clockwise to a position on the dial 71 corresponding to the acceleration or G load caused thereby. The pivoting of the shaft 66 also rotates the radial pin 76 clockwise to rotate the fore ratchet wheel 87 via the driving pin 89 clockwise to move the maximum positive acceleration memory pointer 85. The engagement between the end of the reed 111 and the teeth 83 of the aft ratchet wheel 82 prevents the maximum negative acceleration memory pointer from following the radial pin 76 due to the biasing of the torsion spring 90. As the rate of climb of the aircraft decreases, the coil spring 46 returns the body 25 towards the neutral position and the flat flexure member 58 transmits this return through the rack and pinion gear unit 61 to the shaft 66 allowing the operating pointer 70 to fall back counter-clockwise. The engagement between the end of the reed 112 and the fore ratchet wheel 87 prevents the maximum positive acceleration memory pointer 85 from returning with the operating pointer 70.

If the aircraft is now put into a dive, the body 25 is displaced upwardly relative the frame 11 and this displacement is transmitted by the flexure member 58 through the rack and pinion unit 61 to rotate the shaft 66 and the operating pointer 70 counter-clockwise. Counter-clockwise rotation of the shaft 66 rotates the radial pin 76 and the aft ratchet wheel 82 via the driving peg 84 to rotate the maximum negative acceleration pointer 80 along with the operating pointer 70. When the aircraft comes out of the dive the negative acceleration is decreased permitting the spring 46 to return the body 25 towards the neutral position which is transmitted via the flat flexure member 58 to the rack and pinion unit 61 to rotate the shaft 66 clockwise allowing the pointer 70 to return. The engagement between the end of the first reed 111 and the teeth 83 of the aft ratchet wheel 82 holds the maximum negative acceleration pointer 80 from following the return of the operating pointer 70.

Thus, the memory pointers 80 and 85 hold the maximum readings obtained by the operating pointer 70. These maximum readings are maintained until a higher maximum reading is obtained by the operating pointer 70 or until the reset button 130 is pushed to return the pointers 80 and 85 to the position of the operating pointer 70 as has been previously explained where the pointers 80 and 85 will remain until the operating pointer 70 is again rotated.

Thus, the improved accelerometer according to this invention dependably and accurately indicates the acceleration along the vertical axis thereof that the instrument has been subjected to.

I claim:

1. In an accelerometer for measuring the rate of acceleration along an axis, a frame, an inertial body, means mounting said body to said frame for reciprocation and rotation relative to the axis, yieldable means urging the body to a neutral position along the axis, acceleration displacing the body from the neutral position a distance proportional to the rate of acceleration; indicating means carried by the frame for indicating the displacement of the body from the neutral position and therefore the rate of acceleration, a pinion gear mounted on a shaft of the indicating means, a rack gear mounted for movement along a line parallel to the axis, said rack gear engaging said pinion gear for driving the same, and a flat flexure member connecting the rack gear to the inertial body, said flexure member lying in the plane defined by the axis and the line of rack movement.

2. An accelerometer as in claim 1, wherein said yieldable means includes a threaded post extending from the frame along the axis, a coil spring extending coaxially of said post, one end of said spring being connected to the inertial body, and a collar threadly mounted on the post, said collar having external threads mating with the coils of the spring.

3. An accelerometer as in claim 2 together with means for locking the collar in a desired position on the post.

4. An accelerometer as in claim 1, wherein said indicating means includes a rotatively mounted shaft, a pair of wheels rotatably mounted on the shaft, means carried by the shaft for rotating one wheel when the shaft rotates in one direction and for rotating the other wheel when the shaft rotates in the other direction, and a torsion spring with one end thereof anchored to one wheel and the other end thereof anchored to the other wheel, rotation of one wheel stressing the spring against the other wheel and release of the one wheel permitting the spring to return the one wheel relative to the other wheel.

5. An accelerometer as in claim 4 wherein the shaft, wheels and torsion spring are movable from the frame as a unit and replaceable as a unit.

6. In an accelerometer for measuring the rate of acceleration along an axis, a frame, an inertial body, means mounting said body to said frame for reciprocation and rotation relative to the axis, a rotatively mounted threaded post extending along the axis, said post being constrained against axial movement, a coil spring extending coaxially of said post and engaging the body at one end thereof for yieldably urging the body to a neutral position along the axis, acceleration displacing the body from the neutral position by a distance corresponding to the rate of acceleration, a collar threadedly mounted on the post, said collar having external threads mating with the coils of the spring, a lock nut threadly mounted on the post for engaging the collar and locking the same in a desired position on the post, and indicating means carried by the frame for indicating the displacement of the body from the neutral position and therefore the rate of acceleration.

7. In an accelerometer for measuring the rate of acceleration along an axis, a frame, an inertial body, means mounting said body to said frame for reciprocation and rotation relative to the axis, yieldable means urging the body to a neutral position along the axis, acceleration displacing the body from the neutral position a distance proportional to the rate of acceleration; indicating means carried by the frame for indicating the displacement of the body from the neutral position and therefore the rate of acceleration, said indicating means including a ratchet wheel with circumferential teeth mounted on a shaft, a pawl block having a V-shaped notch slidably mounted on the frame for movement between an outer position away from the wheel circumference and an inner position adjacent the wheel circumference, guide means mounted on the frame for engaging the sides of the notch when the pawl block is in the inner position to precisely locate the block with respect to the wheel, a spring pawl mounted on the pawl block for engaging the teeth of the ratchet wheel when the block is in the inner position and being spaced from the teeth when the block is in the outer position, and means for moving the block between the two positions to selectively release the wheel for rotation in either direction.

8. An accelerometer as in claim 7 wherein the pawl comprises an elongated flexible reed mounted at one end to the block adjacent to the outer end thereof, said reed extending along one side of the block and beyond the inner end thereof toward the wheel, said reed being free to flex away from the side of the block.

9. An accelerometer as in claim 8 wherein the length of the portion of the reed between the inner end of the block and the wheel is substantially less than the length of the portion between the ends of the block.

10. An accelerometer as in claim 7 wherein the means for moving the block includes biasing means for yieldably urging the block toward the inner position and operating means for urging the block against the biasing means to move the block toward the outer position.

11. An accelerometer as in claim 10 wherein the accelerometer is enclosed in an air-tight container and the operating means includes a rod extending through an opening in a wall of the container, one end of the rod being inside the container and the other end being outside the container, means pivotally mounting the rod to the container, and a flexible bellows providing a seal between the rod and the wall around the opening.

12. An accelerometer as in claim 11 wherein the means pivotally mounting the rod locates the pivot point at the center of the bellows.

13. In an accelerometer for measuring the rate of acceleration along an axis, a frame, an inertial body having a groove formed therein, means mounting said body to said frame for reciprocation and rotation relative to the axis, yieldable means urging the body to a neutral position along the axis, acceleration displacing the body from the neutral position a distance proportional to the rate of acceleration, indicating means carried by the frame for indicating the displacement of the body from the neutral position and therefore the rate of acceleration, and catch means movable between locked and unlocked positions for locking the body to the frame, said catch means comprising a pivotally mounted member having a hook at one end thereof for engaging the groove in the body when the catch means is in the locked position, said hook being disengaged from the groove when the catch means is in the unlocked position, a spring urging the hook into engagement with the groove, and a pushbutton slidably mounted on the frame with an extension thereof engaging the pivotally mounted member to pivot the hook out of engagement with the body when the button is pushed.

14. An accelerometer as in claim 13 together with an air-tight container attached to the frame enclosing the same, said container having an opening through a wall thereof through which the pushbutton extends; and an expandable bellows forming a seal between button and the wall around the opening.

* * * * *